United States Patent
Koehler, Sr. et al.

(10) Patent No.: US 6,457,665 B1
(45) Date of Patent: Oct. 1, 2002

(54) FLY REEL LOADER

(76) Inventors: Robert F. Koehler, Sr., 20332 Clark St., Woodland Hills, CA (US) 91367; David Hanggee, 7015 Wyngate St., Tujunga, CA (US) 91042

(*) Notice: Subject to any disclaimer, the term of this patent is extended or adjusted under 35 U.S.C. 154(b) by 0 days.

(21) Appl. No.: 10/079,341

(22) Filed: Feb. 20, 2002

Related U.S. Application Data

(60) Provisional application No. 60/312,235, filed on Aug. 13, 2001.

(51) Int. Cl.[7] ............................................... A01K 89/017
(52) U.S. Cl. .................................................. 242/390.8
(58) Field of Search ............................ 242/390.8, 394.1, 242/902

(56) References Cited

U.S. PATENT DOCUMENTS

| | | |
|---|---|---|
| 1,896,741 A | * 2/1933 | Crandall ..................... 242/902 |
| 2,385,963 A | 10/1945 | Beard |
| 3,077,318 A | 2/1963 | Du Val |
| 3,126,166 A | 3/1964 | Weinberg |
| 3,784,125 A | 1/1974 | Law |
| 4,141,169 A | * 2/1979 | Rieth ....................... 242/394.1 |
| 4,717,086 A | * 1/1988 | Crow ........................ 242/394.1 |
| 4,951,890 A | 8/1990 | Sossamon |
| 4,962,901 A | 10/1990 | Shirley |
| 5,725,172 A | 3/1998 | Koehler |
| 6,015,111 A | 1/2000 | Berke |
| 6,126,104 A | 10/2000 | Kellerman |

* cited by examiner

Primary Examiner—Kathy Matecki
Assistant Examiner—Sang Kim
(74) Attorney, Agent, or Firm—Kelly Bauersfeld Lowry & Kelley LLP

(57) ABSTRACT

A fly-fishing line loader specifically designed for application with a fly reel is provided. The line loader has a disc with a planar surface configured to frictionally engage a conventional fly fishing reel having a plurality of raised nipples and slots. Centrally attached to the disc is a bit extension for use with a portable electric screwdriver or drill motor to rotate the disc and the spool of the fly fishing reel to allow the efficient loading of backer line and fly line on the reel.

14 Claims, 1 Drawing Sheet

FLY REEL LOADER

RELATED APPLICATION

This application claims priority from provisional application No. 60/312,235, filed Aug. 13, 2001.

BACKGROUND OF THE INVENTION

This invention pertains generally to fishing equipment. More specifically, the present invention relates to an apparatus for loading fishing line onto a fly fishing reel.

The sport of fly fishing requires specialized equipment and training in casting and fishing techniques. One essential piece of equipment for fly fishermen is the fly reel. Typically the conventional fly reel is loaded with a backer line first followed by a fly line attached to the end of the backer line. The fly line has special properties that allow the fisherman to whip and snap the fly, tied at the end of the line, in the air while teasing the fish by gently touching the surface of the water with the fly. With practice, the fisherman is able to mimic the pattern of a natural fly that results in prompting a fish to strike the fly and becoming entangled by the hook.

The fly fishing reel is designed, generally, such that the spool, on which the fishing line is loaded, is mounted on a rotating axis that will be perpendicular to the fishing pole when the reel is affixed thereto. In order to lead the spool with line or to retrieve the line after casting, the spool is rotated by use of crank handle attached directly on the face of the fly reel spool.

A casting reel is designed, generally, such that the spool is also mounted on a rotating axis that will be perpendicular to the fishing pole when affixed thereto; whereas, a spinning reel is typically designed such that the spool is mounted on a rotating axis that will be parallel to the fishing pole when affixed thereto. The main difference between the casting reel and the spinning reel, as compared to the fly reel, is that the spool is rotated by use of a crank handle that is not attached directly to the spool, but is attached by a series of gears. The gear ratio on a casting reel or a spinning reel typically ranges from 1:3 to 1:5, so every revolution of the crank handle results in multiple revolutions of the spool.

Not only is it important to have the proper type and weight of fishing line, but the experienced fly fisherman also knows that having fishing line that is clean and properly loaded is essential in order to achieve an accurate and effective casting of the fly. So the fly fisherman often must reload or clean the fly fishing line. However, because the gear ratio on a fly reel is 1:1, as compared to the gear ratios of casting reels or spinning reels, loading or retrieving line onto a fly reel requires more revolutions of the crank handle, which may be more time consuming and tiresome. The present apparatus allows for motorized rotation of the fly reel to simplify the loading and cleaning of the fly line and backer line on the spool of the reel.

While other inventions have been designed to facilitate the loading of fishing line, most are specifically designed for or applicable only to casting or spinning reels, not fly reels. While these previously designed inventions do simplify the task of loading a fishing reel, these inventions are inoperable in their use with fly reels. Hence, these previously designed inventions have significant drawbacks and have not fully addressed the requirements for loading a fly fishing reel.

Loaders known in the art indirectly rotate the spool of the reel by engaging the handle or crankshaft of the reel; these loaders are not designed to directly rotate the spool by engaging the spool. Generally, these loaders put rotational force directly onto the reel handle, which may cause uneven distribution of force on the reel, especially if the reel is comprised of only one handle or crank pin (as is often the case with fly reels), which may result in unnecessary stress and wear on the reel bearings.

These loaders are unidirectional, particularly because of the type of reel for which they are adapted. They are able to only load fishing line on the spool or unload fishing line from the spool. A spinning reel or a casting reel is typically geared to only allow for unidirectional rotation of the crank shaft, often in the direction of loading the spool. Hence, the loaders were designed merely for unidirectional operation.

Some loaders are comprised of multiple pieces, some of which are fixedly attached to the reel. These loaders, thus, are typically not interchangeable for left-and right-handed reels. Separate pieces are required to adapt the loader for a left- or a right-handed reel.

Accordingly, there exists a need for a loader that is designed for specific application to a fly reel, that distributes the rotational force directly and evenly against the spool, that is unidirectional, and that is interchangeable for left- and right-handed reels. The current invention fulfills these needs as well as others.

SUMMARY OF THE INVENTION

The present invention comprises an apparatus that simplifies loading or cleaning and treating fly line on a fly reel. The invention frictionally engages with the spool of a fly reel and rotates the spool in the desired direction upon rotation with a portable screwdriver. The fly reel loader of the present invention may be used in connection with the fishing line winder of U.S. Pat. No. 5,725,172, the contents of which are incorporated herein.

By way of example and not of limitation, the fly reel loader apparatus of the present invention generally comprises a disc having a front and a back side, a plurality of nipples integral with the disc's front side and extending outward thereon, a hexagonal bit integral with the disc's backside and extending outward thereon, and at least one slot on the disc to provide clearance for the fly reel crank pin. The disc's front side is centered on the fly reel spool faceplate with the crank pin passing through the slot, such that the nipples press against the spool faceplate. The hexagonal bit is attached to an electric screw driver with use of, perhaps, a 5/16-inch nut drive. Upon activation of the screwdriver and frictional engagement by the nipples against the spool faceplate, the spool rotates in the desired direction while line loads onto the spool.

In one embodiment the front side of the disc has a central portion with a concave surface so that the planar disc face can firmly engage the reel without interference from an axial nut or bolt head on the reel.

Another embodiment includes two sets of holes within the disc preferably positioned eccentrically and symmetrically through the plane of the disc.

Use of the apparatus of the present invention results in a faster way to load fly line and backing onto the fly reel. Additionally, a cleaning pad can be applied to the fly line while it is loading to effectively clean and treat the line for more effective casting. Furthermore, the line can be easily guided for a uniform load onto the spool.

An object of the invention is to provide an apparatus capable of eliminating the long and tiresome hand loading or cleaning and treating fly line on a fly reel.

Another object of the invention is to provide an apparatus that is small and compact and capable of being used either at home, in the shop, or on a fishing expedition.

Still another object of the invention is to provide an apparatus that is easy to manufacture and inexpensive to the consumer.

Another object of the invention is to provide an apparatus that is versatile for use with many different makes and models of fly reels, is simple to use, and requires no adjustments.

Still another object of the invention is to provide an apparatus that will distribute equal force against the fly reel so that the bearings are not subject to biased or unequal force.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings that are for illustrative purposes only.

DETAILED DESCRIPTION OF THE PREFERRED EMBODIMENTS

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Figure 1:
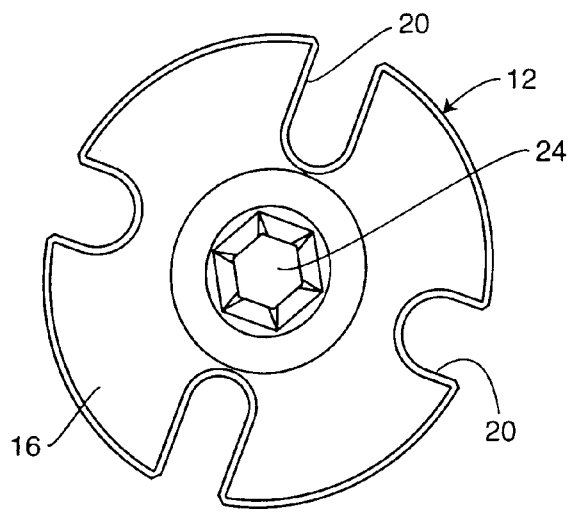
FIG. 1 is back side view of apparatus according to the present invention;.
Figure 2:
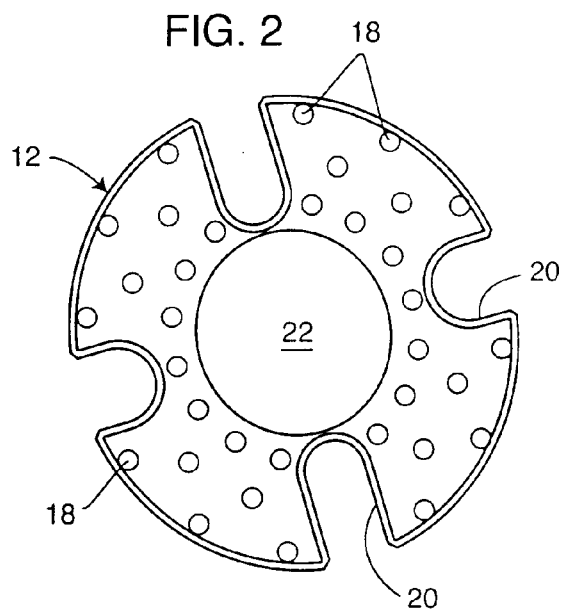
FIG. 2 is front side view of apparatus shown in FIG. 1.

Referring first to FIGS. 1 and 2, a fly-reel loader apparatus 10 of the present invention is generally shown. The apparatus 10 generally comprises a disc 12, having a planar front side 14 and a back side 16. Apparatus 10 is designed such that the disc's front side 14 is frictionally engageable with the face plate of a fly reel and the disc's back side 16 is removably attachable to an electrical rotating device, such as a hand-held battery operated screwdriver or drill.

Figure 3:
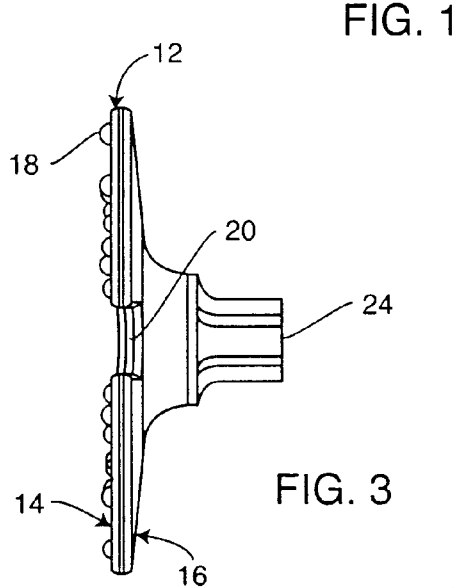
FIG. 3 is side plan view of apparatus shown in FIG. 1 according to the present invention.

In the preferred embodiment, an elongate hexagonal bit 24 is disposed in approximately the center of the back side 16 of the disc 12, as seen in FIGS. 1 and 3. The bit 24 may receive a nut drive that is attached to an electrical motor device that can impart rotational motion to the apparatus. The apparatus 10 may be rotated in either a clockwise or counter-clockwise direction by use of a bi-directional electronic device, such as an electric screwdriver or power drill.

Figure 4:
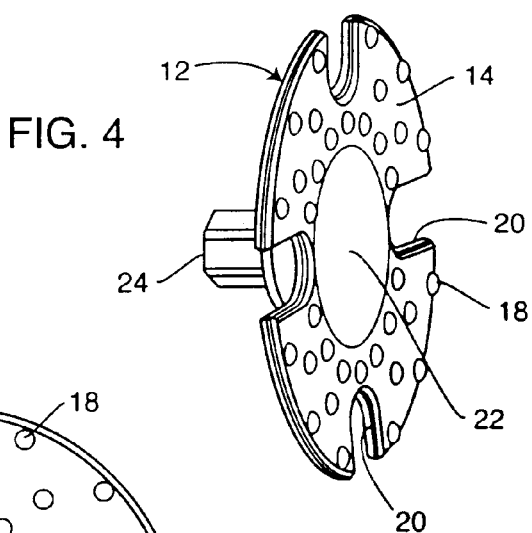
FIG. 4 is perspective view of apparatus shown in FIG. 1.

Referring also to FIGS. 3 and 4, it can be seen that the front side 14 of disc 12 has a means for frictionally engaging the faceplate of a reel. In the preferred embodiment, the frictional engaging means is represented by a plurality of nipples 18 integrally attached to the disc's front side 14. The function of the nipples 18 is to make contact with the faceplate of the reel, thereby frictionally engaging the face plate as the disc 12 is rotated, thus rotating the faceplate.

Although the nipples 18 may be randomly dispersed along the disc's front side 14, it is also contemplated that the nipples 18 be strategically positioned to coincide with the perforations or holes typically present on many types of fly reels. Hence, by aligning the nipples 18 with the fly reel perforations, the frictional engagement is enhanced. In one embodiment, the nipples are substantially half-moon shaped with dimensions approximately 1/8-inch in diameter and approximately 1/16 inch in height. However, different shapes and dimensions of the nipples are also contemplated.

Furthermore, in the preferred embodiment, disc 12 has at least one slot 20 20 for clearance of the crank pin of a fly reel. The slot 20 allows the apparatus 10 to be in contact with substantially the full diameter of the faceplate, thereby allowing for more surface contact for increased frictional engagement of the faceplate as the disc 12 is rotated. In one embodiment, disc 12 has a plurality of slots 20 having different dimensions to accommodate a variety of crank pin configurations on different makes or models of fly reels. In another embodiment, disc 12 has a set of slots 20 that are diametrically opposed to each other with substantially similar dimensions to accommodate fly reels with multiple crank pins.

In the embodiment shown, the front side 14 of disc 12 has a concave depression 22, located substantially in the center of the disc's front side 14. The depression 22 allows the apparatus 10 not to interfere with or be impeded by the central axle or retaining nut of a central axle (or any similar component) of the fly reel.

In the preferred embodiment, apparatus 10 is a single-piece unit that is made of a rigid, yet flexible, resiliently rigid material that will provide for optimal performance without scratching or marring the fly reel 12. While the preferred material of choice is polyurethane, other materials are contemplated, including but no limited to other polymers, wood, or metal.

Figure 5:
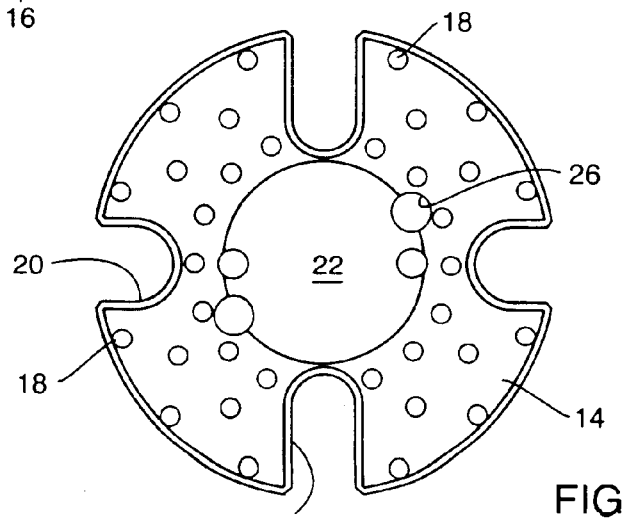
FIG. 5 is a front view of an alternative embodiment of the invention.

Turning now to FIG. 5, an alternative embodiment of the apparatus 10 is shown. In the embodiment shown, two pairs of holes 26 are present on opposite sides of the depression 22. These four holes 26 are provided in the face of the apparatus 10 to adapt it to some of the fly reels that have protrusions in similar locations. The fly reel protrusions fit into the holes 26 to allow the fly reel loader to fit flush and make positive contact with the fly reel.

In use, the apparatus 10 may be used to load or unload fishing line (including the backing line and the fly line) on a fly reel spool. The hexagonal bit 24 on the disc's back side 16 is engaged by an electric device, using, although other sizes are contemplated, a 7/16-inch nut drive with a 1/4-inch shank is preferred. Then, the disc's front side 14 engages the spool faceplate of the reel, simply by pushing the front side 14 against the faceplate. To ensure more evenly applied pressure against the faceplate, the apparatus 10 is preferably aligned such that the crank pin passes through the slot 20 on the disc 12. The nipples 18 are pressed against the faceplate, preferably so that some, if not all, are engaging the perforations in the faceplate of the reel. Then, by turning on the electrical device (such as a battery-operated screwdriver or drill), the disc 12 will rotate the spool. The apparatus 10 may be used in either clockwise or counter-clockwise direction. Hence, the apparatus 10 can be used with a left-or right-handed reel. Additionally, while loading the spool, the fishing line may be passed through a cleaning pad to remove debris or buildup on the line.

With use of the apparatus 10, the fly fisherman can more easily load or unload fishing line onto the fly reel. The apparatus 10 may be easily used at home, in a shop, or outside during a fishing expedition.

Although the description above contains many specificities, these should not be construed as limiting the scope of the invention but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Morever, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Although several embodiments have been described in detail for purposes of illustration, various modifications may be made without departing from the scope and spirit of the invention. Accordingly, the invention is not to be limited, except as by the appended claims.

What is claimed is:

1. A fly fish reel loader for use with a fly reel having a spool for holding fishing line, the fly fish reel loader comprising:
   a disc having a back side, a front side, and a plurality of slots having different dimensions to accommodate a variety of crank pin configurations;
   means for rotating said disc integral with said disc's back side; and
   means for frictionally engaging said disc's front side with the fly fish reel spool;
   wherein the disc, the rotating means and the frictionally engaging means form a single-piece unit of resiliently rigid material.

2. A loader according to claim 1, wherein said rotating means comprises a bit extending outward.

3. A loader according to claim 2, wherein said bit is hexagonal in shape.

4. A loader according to claim 1, wherein said frictionally engaging means comprises a plurality of outward extending nipples.

5. A loader accordingly to claim 4, wherein the nipples are substantially half-moon shaped with dimensions approximately 1/8-inch in diameter and approximately 1/16-inch in height.

6. A loader according to claim 1, wherein said front side of disc has a substantially central concave depression.

7. A loader according to claim 1, wherein the disc includes two pairs of holes on opposite sides of the rotating means.

8. A fly fish loader for use with a fly reel having a spool for holding fishing line, the fly fish loader comprising:
   a disc having a front side, a back side, and a plurality of slots having different dimensions to accommodate a variety of crank pin configurations;
   a plurality of outward extruding nipples integral with said disc's front side, wherein the nipples are substantially half-moon shaped with dimensions approximately 1/8-inch in diameter and approximately 1/16-inch in height; and
   means for rotating said disc integral with said disc's backside;
   wherein the disc, the nipples and the rotating means form a single-piece unit of resiliently rigid material.

9. A loader according to claim 8, wherein said plurality of nipples are strategically placed to engage with the holes of the spool.

10. A loader according to claim 8, wherein said rotating means comprises a bit extension.

11. A loader according to claim 10, wherein said bit extension is approximately hexagonally shaped.

12. A loader according to claim 8, wherein said disc's front side has a substantially central concave.

13. A loader according to claim 8, wherein the disc includes two pairs of holes on opposite sides of the rotating means.

14. A fly fish reel loader for use with a fly reel having a spool for holding fishing line, the fly fish loader comprising;
   a disc having a front side, a back side, and a plurality of slots having different dimensions to accommodate a variety of crank pin configurations on different makes or models of fly reels, and two pairs of holes on opposite sides of the disc, wherein said disc's front side has a substantially central concave depression;
   a plurality of outward extruding nipples integral with said disc's front side, wherein said nipples are coincident to engage with the holes of the spool, and wherein the nipples are substantially half-moon shape with dimensions approximately 1/8-inch in diameter and approximately 1/16-inch in height; and
   a hexagonally shaped bit extension integral with said disc's back side, wherein said bit is substantially positioned in the center of said disc's back side;
   wherein the disc, the rotating means and the frictionally engaging means form a single-piece unit of resiliently rigid material.

* * * * *